United States Patent [19]

Yamada

[11] Patent Number: 4,672,462
[45] Date of Patent: Jun. 9, 1987

[54] METHOD AND SYSTEM FOR RECORDING PLURAL IMAGES ON A PHOTOSENSITIVE FILM WITH LAYOUT WORK

[75] Inventor: Mitsuhiko Yamada, Kyoto, Japan

[73] Assignee: Dainippon Screen Mfg. Co., Ltd., Kyoto, Japan

[21] Appl. No.: 517,982

[22] Filed: Jul. 29, 1983

[30] Foreign Application Priority Data

Oct. 21, 1982 [JP] Japan .................... 57-185067

[51] Int. Cl.⁴ ............................................. H04N 1/40
[52] U.S. Cl. .................................. 358/280; 358/256; 382/45; 382/46; 364/523
[58] Field of Search ............... 358/258, 287, 293, 294, 358/280, 256; 382/41, 44, 46, 45, 56; 364/514, 518, 521, 523, 522; 355/25, 82

[56] References Cited

U.S. PATENT DOCUMENTS

| | | |
|---|---|---|
| 3,976,982 | 8/1976 | Eiseline .................... 358/287 |
| 4,007,362 | 2/1977 | Sindermann ............... 358/280 |
| 4,345,276 | 8/1982 | Colomb ..................... 358/258 |
| 4,553,172 | 11/1985 | Yamada et al. ............. 358/280 |
| 4,556,901 | 12/1985 | Sakamoto .................. 358/75 |
| 4,580,060 | 4/1986 | Sakamoto .................. 250/578 |

FOREIGN PATENT DOCUMENTS

| | | |
|---|---|---|
| 0105468 | 4/1984 | European Pat. Off. . |
| 2062396 | 2/1981 | United Kingdom . |
| 2082014 | 2/1982 | United Kingdom . |
| 2089165 | 6/1982 | United Kingdom . |

OTHER PUBLICATIONS

Forte, J. et al. "The Automation of Newspaper Graphic" Electronic Progress, vol. 18, No. 2, pp. 23-28, 1976.

Levine, G. B. et al. "Specialized Hardware for Newspaper Processing" Electronic Progress, vol. 18, No. 2, pp. 9-14, 1976.

Primary Examiner—Edward L. Coles, Sr.
Attorney, Agent, or Firm—Lowe Price Leblanc Becker & Shur

[57] ABSTRACT

A layout function of an image reproducing system is expanded to be capable of performing imposition work on a photosensitive film for producing a print sheet with multiple page units reproduced from original pictures.

19 Claims, 8 Drawing Figures

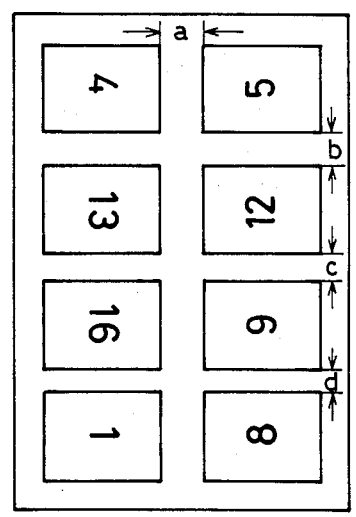

METHOD AND SYSTEM FOR RECORDING PLURAL IMAGES ON A PHOTOSENSITIVE FILM WITH LAYOUT WORK

FIELD OF THE INVENTION

This invention relates to a method of recording plural images on a photosensitive film with plural page units conventional in a bookbinding process when a film consisting of plural page units are produced.

BACKGROUND OF THE INVENTION

Recently, a so-called layout scanner was invented and put to practical use in some fields, which adopts steps of inputting multiple picture data and letter (drawing) data obtained from respective input scanners to respective large capacity memory units such as a disc memory, displaying both data on a monitoring device such as a CRT displaying unit, assembling both data to be a complete image with use of such as a digitizer under control of a CPU (central processing unit).

In this kind of system, letter (drawing) data can be obtained from scanning of a letter copy as well as for picture data, which method is disclosed in Japanese Patent Applicatons Nos. 57-6650, 57-18184, 57-39877 and corresponding U.S. applications Ser. Nos. 459,157 now U.S. Pat. No. 4,556,901; 464,907 now U.S. Pat. No. 4,580,060 and 471,869 now U.S. Pat. No. 4,553,172 assigned to the assignee of this invention.

Such a layout scanner system adopts steps of inputting data corresponding to the picture and letter components to a large capacity memory device such as a disc memory, laying out the picture and the letter components corresponding to the stored data onto a desired area of one sheet with use of a monitoring device such as a CRT displaying device and a digitizer, storing the determined image as data into certain cells of designated addresses of the disc memory in order to output the determined image for final printing, outputting said data from the disc memory to a raster-scanning recording device, and exposing a film to a beam modulated by the determined data to record thus laid-out images.

Meanwhile, ordinary printing machines can print a rather large size sheet such as A1 (594×841 mm) size paper at a time. Therefore provided that a page unit is A4 (210×297 mm) size and a sheet in a printing process such as for printing magazines, is A1 size eight said A4 size page units are assembled onto one print sheet. This assembly procedure means that certain page units are automatically assembled for a bookbending process on a photosensitive film in proper directions and positions in a film producing process beforehand to be proper in order and lengthwise, and said procedure usually considers margins.

Conventional imposition procedure is usually rearranged owing to a method of folding a print sheet, that is, the procedure is carried out according to conduct of an operator who places each page unit successively onto a transparent base film, the scale of which is the same as the print sheet, while confirming a sample of the method of folding the print sheet. But this method requires the operator on keep close watch to the directions and positions of the page units, resulting in inefficiency.

FIG. 1 shows an example of the imposition procedure, in which the observe (a) and reverse (b) faces of an A1 size print sheet carrying eight A4 size page units are given. Thus assembled final print sheet is folded orderly to be a determined scale and is trimmed to be a book. In FIG. 1, the numbers are actual page numbers for publishing, and the directions of the numbers shows the actual directions of reproduced images.

For example, the square numbered 4 in FIG. 1(a) indicates a reproduced image the top of which faces the right side and the bottom of which faces the left side, which means it will be properly situated in the finally bound items (pamphlet, magazine, etc.). FIG. 2 is a detail of FIG. 1, wherein a, b, c and d are margins and gutters for cutting and folding. Meanwhile thickness of a folded sheet is varied according to the number of page units and when saddle stitching (often used for magazines or catalogues) is adopted for bookbinding, there must be some difference in gutter width between page units which are to be inner pages and page units which are to be outer pages. Therefore, measures of said margins and gutters a, b, c, d are to be varied according to the number of assembled page units or binding method, which leads to a difficult work task even for experienced operators. Furthermore, when the desired prints must be colored, more accuracy is required in placing page units onto transparent sheets, which also results in inefficient operation.

SUMMARY OF THE INVENTION

The object of this invention is to overcome the abovesaid conventional defects in the imposition process by expanding the function of a layout system.

In other words, this invention is made to apply the conventional layout process (for one page unit) to a print sheet scale in order to be capable of imposition work. The layout work for each page unit is carried out after said imposition work.

Data of intervals and directions about page units are either stored in a memory beforehand or designated by an operator, and the data are utilized for simulating actual imposition work on a picture display device.

Moreover, it is preferable that picture data of each page unit is supplied as being same as for actual printing of their direction factor.

The above and other objects and features of this invention can be appreciated more fully from the following detailed description when read with reference to the accompanying drawings.

BRIEF DESCRIPTION OF THE DRAWINGS

FIGS. 1a–b are prints composed of multiple page units;

FIG. 2 is a detailed chart of FIG. 1;

FIGS. 8a–8d illustrate a flow chart describing operation of a CPU in the embodiment of FIG. 3.

PREFERRED EMBODIMENT OF THE INVENTION

Figure 3:
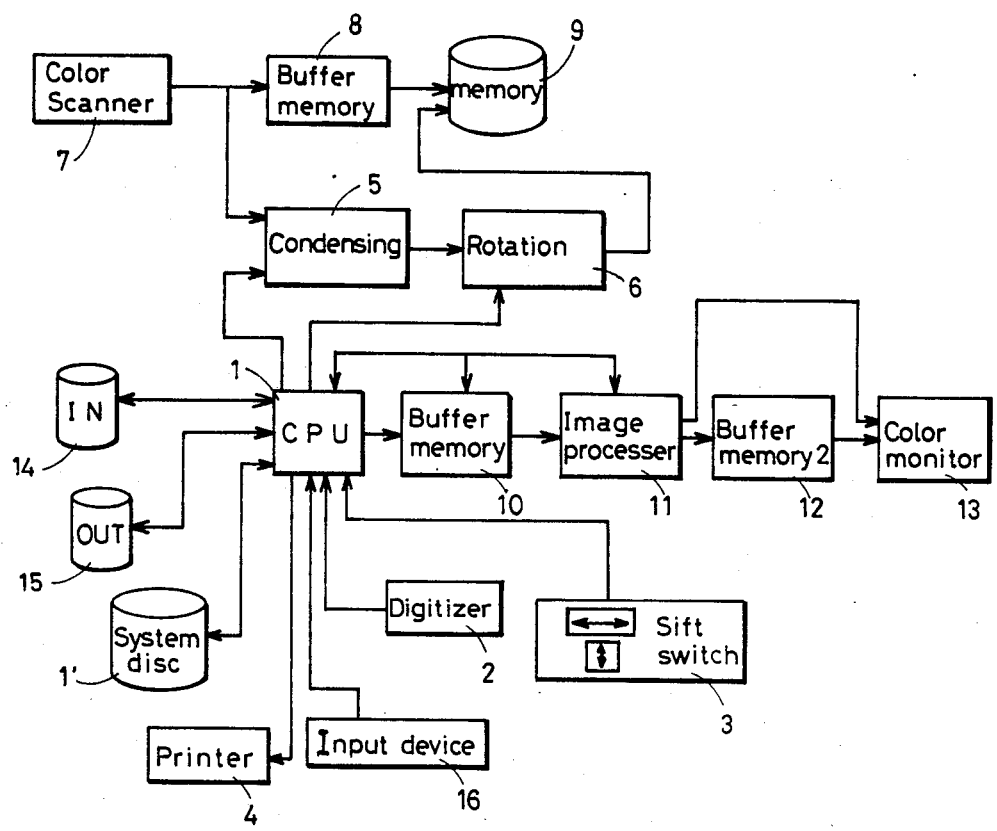
FIG. 3 is an embodiment of the method of this invention.

FIG. 3 is an embodiment of a device of this invention, in which a memory loaded with imposition data is provided in a CPU (central processing unit) 1 beforehand (this data can be input from floppy discs) as mentioned later.

CPU 1 generally functions in accordance with the description of the flow chart of FIGS. 8a–8d, which may be used in conjunction with the following description to understand operation of the invention.

Figure 4:
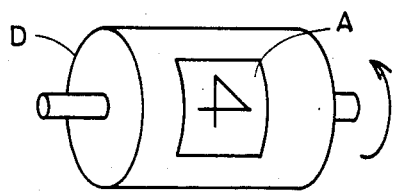
FIG. 4 is an example of a page unit placed on an original picture drum.

At first, when data to designate the page numbers for each page unit are registered into the CPU 1 by using an input device 16 such as a key board, the CPU 1 designates to a printer 4 the correct directions of each page unit which is to be placed on an original picture drum. FIG. 4 shows the page units are placed on the original picture drum D according to the designation data. Then the CPU 1 designates a condensing circuit 5 to condense (average) scanned data corresponding to certain area of the original picture into a condensed data in order to be supplied to a color monitor 13 such as a color CRT screen, because the scanned data are more detailed on account of being used for actual image reproducing which are not appropriate for the monitor device if remain untouched.

Assuming that a scanned data of the original picture have m (longitudinal)×n (lateral) pixels, to display an image corresponding to the data on the color monitoring device 13 (ordinarily this is a CRT screen having 500×500 pixels) the data must be condensed by a ratio of the greater of the fractions m/500 or n/500. Then the CPU 1 computes the appropriate ratio and designates the condensing circuit 5 to condense the picture data by the computed ratio to output them to a rotation circuit 6.

There are considered several ways to condense said data, one of which has steps of storing picture data corresponding to a certain number of scanning lines (when m/500 is a condensation ratio, the value is the line number) into some line memories, condensing the data group for one scanning line (corresponding to the number of m/500 pixels) of the CRT screen.

The rotation circuit 6 has 8 bit memories for each pixel of Y, M, C, K colors for supplying the color data to the 500×500 pixels of the CRT screen, to which the condensed data of four colors from the condensing circuit 5 are successively written. Meanwhile, the picture data signal from the color scanner 7 are stored through a buffer memory 8 into a disc memory 9.

Then the CPU gives a command to the rotation circuit 6 to rotate the scanned data of a recumbent picture (as shown in FIG. 4) on a picture drum D by ninety degrees counterclockwise to supply the data as perpendicular data to the color monitor.

Figure 5A:
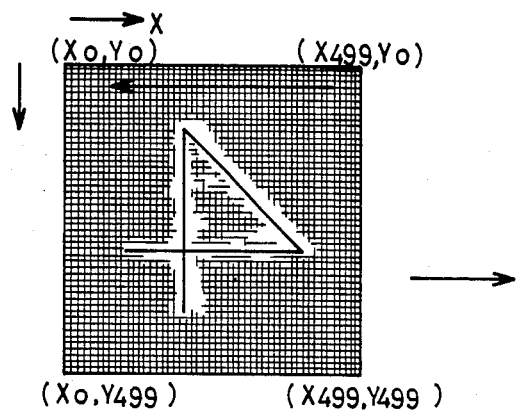
FIG. 5(a) shows a manner of reading a condensed data of an original picture from a rotation circuit 6.
Figure 5B:
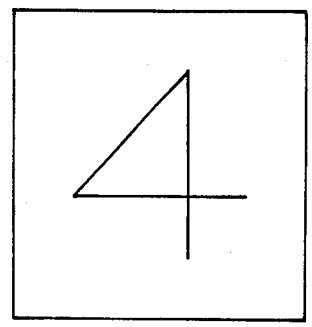
FIG. 5(b) shows a displayed picture on a monitor device.

That is, the rotation circuit 6 converts the recumbent picture data into a corresponding perpendicular picture data being appropriate for the color monitor 13 by successively reading each pixel data in order from the address $(X_{499}, Y_0)$ to the address $(X_0, Y_0)$, then from the address $(X_{499}, Y_1)$ to the address $(X_0, Y_1)$ . . . as shown in FIGS. 5(a) (b) and input the converted data to a disc memory 9 as monitoring data.

Thus stored recording data and monitoring data in the disc memory 9 are then transferred to a disc memory 14. The transfer can be attained by manually changing the disc memory 9 for the disc memory 14 when the discs are of the media exchanging type or by transporting the data stored in the memory 9 to the memory 14 or utilizing the memory 9 itself as the memory 14 when the discs are of a fixed type.

There are thus stored in a system disc 1' combined to the CPU 1 the sheet data having several imposition data, such as position and direction data of each page units and space and margin data between page units, to record an image on a photosensitive material as shown in FIG. 1. The stored data are read on request to be utilized for controlling display on the color monitor 13 wherein page units are completely distributed. In said procedure, measures of a, b, c, d as shown in FIG. 2 can be designated by an operator through the input device 16. Meanwhile, when an imposition procedure other than memorized in said system disc 1' must be performed, directions and positions of the page units can be designated on the color monitor 13 with use of a digitizer 2. In said manner data for designating directions and positions of the page units on a print sheet are constructed.

Figure 6:
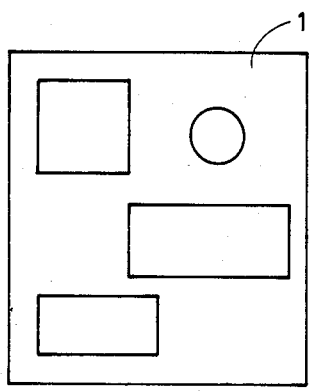
FIG. 6 shows a line frame pattern of the picture units on the monitor device.
Figure 7:
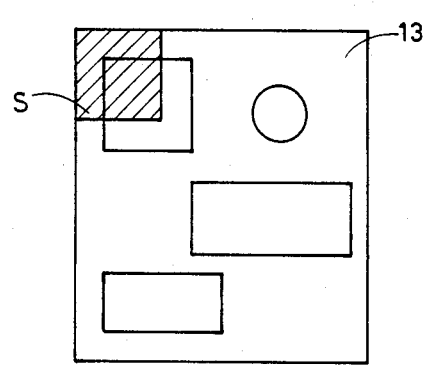
FIG. 7 shows a relation between the line frames and the picture units themselves.

Then, when position data for the page units are input to a buffer memory 12 at command of the CPU 1 by using the digitizer 2, the imposition procedure with the page units is carried out and the data are utilized to be displayed on the color monitor 13 as shown in FIG. 6. According to the position data, the page units are displayed on the color monitor 13 as follows.

At first, display data of the original picture are read from the disc memory 14 and stored into a buffer memory 10 at command of the CPU 1. The display data are read to an image processor 11 which is controlled by a shift switch 3 shown in FIG. 3 via the CPU 1 to shift a picture on the color monitor 13 corresponding to the display data to a desired direction. When a position of the picture is determined on the color monitor 13, data of the position are stored into cells of corresponding addresses of a buffer memory 12. Of course, this transmitting procedure of the position data from the buffer memory 10 to the buffer memory 12 is carried out only of the inside area of the page units. This position data of each picture (page unit) are under control of the CPU 1, and are utilized as data for assembling the final image in an output disc memory 15.

The image processor 11 has an assembled function to display a image of all the page units on the color monitor 13, condensed by a certain ratio appropriate for the color monitor, wherein the page units have already undergone condensation and rotation as mentioned before. Moreover this image processor is composed of a so-called array processor mainly consisting of a look-up-table memory, so it can perform correction on color tone gradation of an image to be reproduced and on partial color tone.

This array processor is well known, so a detailed description of it is eliminated from here.

Furthermore the image processor 11 has a converter which converts Y, M, C, K color data into Red (R), Green (G), Blue (B) data as disclosed in Japanese Patent Application No. 56-144792 offered by the same applicant of this invention, which color data are to be used for displaying the color monitor 13 and to be stored into the buffer memory 12. Other necessary circuits such as a controller to display the color monitor 13 are the same as for an ordinary color monitor system for treating image signals, so no detailed description about it is mentioned here.

The above embodiment adopts a method to set direction of the page units properly when placed on the original picture drum, while another method can be adopted such that the page units are routinely placed in a same direction to be scanned and written into the disc memory 9 as data, which are to undergo a rotation procedure by a layout operation afterwards. But as the rotation procedure is a time-consuming work, it is not practical.

Comparing to a conventional method which assembles data of the page units, each of which has already undergone a layout procedure, when the data are transmitted from a disc for layout procedure to a disc for sorting system, the method of this invention has an advantage integrating the conventional two procedures into one.

As is mentioned above, the method of this invention adopts a way to assemble multiple page units according to the size of the employed print sheet as well as layout procedure in the layout stage, which results in improved function of the layout procedure and in time conservation for imposition work even for poorly skilled workers.

What is claimed is:

1. A method for recording images of a plurality of pages on a photosensitive film together with a layout procedure by storing internal picture data of multiple page units to be read successively for subsequent display on a picture monitor, and for thereafter assembling the page units according to a desired layout chart comprising the steps of:
   (a) impositioning of each of said plurality of page units for reproducing a position image of said page units on the picture monitor according to imposition formation data representing a desired formation of said plurality of page units a for final bookbinding process, and thereafter
   (b) determining internal picture data of each page unit for display on the picture monitor.

2. A method according to claim 1 comprising a further step of storing said imposition format data beforehand, in accordance with requirement of a subsequent bookbinding process.

3. A method according to claim 2 comprising the further steps of displaying the imposition data on the picture monitor and varying the imposition data.

4. A method according to claim 1 comprising the further step of inputting the imposition data from a manual input means such as a keyboard.

5. A method according to claim 1 comprising the further steps of successively placing original page units on an original picture drum, obtaining data representative of the original page units, and using the obtained data according to direction factors therefor from said imposition formation data in the layout procedure and for providing an output.

6. A method according to claim 5 comprising the further steps of condensing the obtained data for display on the picture monitor and rotating the obtained data to be perpendicular on the picture monitor display for use in the layout procedure.

7. A system for recording images of a plurality of pages on a photosensitive film with layout work by storing internal picture data of multiple page units to be read successively for subsequent display on a picture monitor, and for thereafter assembling the page units according to a desired layout chart comprising:

(a) an impositioning means for impositioning each of said plurality of page units for reproducing a position image of said page units on the picture monitor according to imposition data representing a desired formation of said plurality of page units for final bookbinding process, and
(b) a layout means for determining internal picture data of each page unit for display on the picture monitor.

8. A system according to claim 7 further comprising an imposition data providing means for providing said imposition data and an imposition data control means which controls the display on said picture monitor in accordance with said imposition data from said imposition data providing means.

9. A system according to claim 8 in which said imposition data providing means composite a memory device.

10. A system according to claim 8 in which said imposition data providing means comprises a manual input means such as a keyboard.

11. A system according to claim 7 in which said layout means includes a layout data storing means comprising:
   (a) a condensing circuit means for converting picture data obtained from an original page unit into appropriate data for display on a picture monitor; and
   (b) a rotation circuit means for converting the data obtained from the original picture via said condensing circuit means into a perpendicular picture data and for storing said perpendicular picture data in a memory device.

12. A method for recording images of a plurality of pages on two sides of a sheet, comprising the steps of:

positioning a plurality of sequential pages on a scanner drum according to a first sequence for imaging specific pages at specific positions, orientations, and spacing;

scanning each page according to said first sequence to produce image data therefor;

storing in a first storage means image data representative of images on each of said pages and rotated data for upright display of said pages on a monitor;

retrieving stored imposition data including position, orientation, and spacing data representative of said pages;

retrieving stored image data for display of pages on the monitor;

displaying the retrieved imposition data and the retrieved image data;

manipulating the displayed retrieved image data to position the pages oriented in directions determined by a second sequence;

storing manipulated imposition data representative of said manipulated page images in a second storage means at locations corresponding to the manipulated page position and orientation;

performing layout operations on the pages;

obtaining said stored page image manipulated data according to said first sequence for recording on said sheet;

transferring said obtained page image data to an output memory in accordance with the imposition data therefor stored in said second storage means; and recording said transferred data to provide said differently rotated and arranged images of said pages according to said different sequence thereby positioning the images of said pages on a single sheet in accordance with a predetermined folding and cutting sequence to arrange said rotated pages imaged in accordance with said different sequence as sequentially numbered pages of a book.

13. A method as recited in claim 12 wherein said recording step comprises the steps of recording images of the pages on obverse and reverse faces of said sheet to provide sequentially numbered pages of a book.

14. A method as recited in claim 13 comprising the further step of folding said sheet having images on both sides thereof, and cutting the folded sheet to provide said sequentially numbered pages.

15. A method as recited in claim 14 comprising the further step of binding the cut portions of said sheet to form a book having sequentially numbered pages therein.

16. Apparatus for recording a plurality of page images on two sides of a sheet, comprising:

positioning means for positioning a plurality of sequential pages on a scanner drum according to a first sequence for imaging specific pages at specific positions, orientations, and spacing;

scanning means for scanning each page according to said first sequence to produce image data therefor;

first storage means for storing image data representative of images of each of said pages and rotated data for upright display of said pages on a monitor;

control means operable for retrieving stored imposition data including position data, orientation, and spacing data representative of said pages;

said control means further operable for retrieving stored image data for display of pages on the monitor;

said control means further operable for displaying the retrieved imposition data and the retrieved image data on the monitor;

said control means further operable for manipulating the displayed retrieved image data to position the pages oriented in directions determined by a second sequence;

second storage means for storing manipulated imposition data representative of said manipulated page images in a second storage means at locations corresponding to the manipulated page position and orientation;

said control means operable for performing layout operations on the pages;

said control means further operable for obtaining said stored page image manipulated data according to said first sequence for recording on said sheet;

said control means further operable for transferring said obtained page image data to an output memory in accordance with the imposition data therefor stored in said second storage means; and recording means for recording said transferred data to provide said differently rotated and arranged images of said pages according to said different sequence thereby positioning the images of said pages on a single sheet in accordance with a predetermined folding and cutting sequence to arrange said rotated pages imaged in accordance with said different sequence as sequentially numbered pages of a book.

17. An apparatus as recited in claim 16 wherein said recording means comprises second imaging means for imaging the pages on obverse and reverse faces of said sheet to provide sequentially numbered pages of a book.

18. An apparatus as recited in claim 17 further comprising folding means for folding said sheet having images on both sides thereof, and cutting means for cutting the folded sheet to provide said sequentially numbered pages.

19. An apparatus as recited in claim 18 further comprising binding means for binding the cut portions of said sheet to form a book having sequentially numbered pages therein.

* * * * *